United States Patent [19]

Wesch et al.

[11] 4,123,575

[45] Oct. 31, 1978

[54] FIRE-RETARDING EPOXY RESIN MATERIAL, METHOD FOR THE MANUFACTURE THEREOF AND USE THEREOF AS COATING COMPOSITION

[76] Inventors: Ludwig Wesch, Görresstrasse 54, Heidelberg, Germany; Luis C. Roma, C/Montserrat 22, Sabadell; Carlos F. Pellicer, C/Balmes 454 s/a, Barcelona, both of Spain

[21] Appl. No.: 764,849

[22] Filed: Feb. 2, 1977

[30] Foreign Application Priority Data

Feb. 3, 1976 [ES] Spain ..................................... 444.862

[51] Int. Cl.$^2$ .......................... C09K 3/28; B05D 3/04; C08L 63/02
[52] U.S. Cl. ................. 427/386; 106/15 FP; 260/37 EP; 260/45.7 PH; 260/45.9 P; 260/45.9 AM; 427/390 D; 427/407 R; 428/413; 428/414
[58] Field of Search ...... 260/37 EP, 45.9 P, 45.7 PH, 260/45.9 AM; 428/413, 414; 106/15 FP; 427/386, 407 R, 390 D

[56] References Cited

U.S. PATENT DOCUMENTS

| 3,645,971 | 2/1972 | Hindersinn | 260/37 EP X |
|---|---|---|---|
| 3,801,333 | 4/1974 | Kuehn | 106/15 FP |
| 3,855,138 | 12/1974 | Roth | 106/15 FP X |
| 3,865,760 | 2/1975 | Pitts et al. | 106/15 FP X |
| 3,899,463 | 8/1975 | Newcombe | 106/15 FP X |
| 3,931,095 | 1/1976 | Kondo et al. | 106/15 FP X |
| 3,981,832 | 9/1976 | Godfried | 260/37 EP X |

Primary Examiner—Lewis T. Jacobs
Attorney, Agent, or Firm—Hopgood, Calimafde, Kalil, Blaustein and Lieberman

[57] ABSTRACT

A fire-retarding foam-forming epoxy resin composition is provided and a method for applying the same as a coating on a substrate, said composition comprising essentially an amine-hardened epoxy resin containing 30% to 70% by weight of said amine-hardened epoxy resin of at least two substances selected from the group consisting of more than 20 mol% nitrogen and/or phosphorus having a decomposition temperature ranging from about 100° C to 400° C. The composition may optionally contain fillers which react endothermically at elevated temperatures.

17 Claims, No Drawings

FIRE-RETARDING EPOXY RESIN MATERIAL, METHOD FOR THE MANUFACTURE THEREOF AND USE THEREOF AS COATING COMPOSITION

This invention relates to a fire-retarding epoxy resin material, a method for the manufacture thereof and the use of the epoxy resin material as coating composition, for instance, as fireproof paint or in fireproof laminates.

It is known to produce heat-insulating, and thus also flame-resistant, epoxy resin materials by mixing, as binder, an epoxy resin resin which carbonizes under the action of heat with fillers which are inert at normal temperature and which undergo stepwise, with consumption of heat, chemical reactions at higher and higher temperature per reaction stage. In these reactions, there are frequently liberated substances which are transformed in the following reaction. For example, a filler of sodium tetraborate and monobasic ammonium phosphate in an amine-cured epoxide polysulfide resin mixture as binder can give off ammonia upon heating, whereby the carbonizing resin is imparted a foamlike, porous structure. The boron trioxide formed in a subsequent reaction forms a heat-reflecting or absorbing layer on the porous carbonized residues. Another reaction product is water, which by its heat of vaporization and, in addition, by endothermic formation of hydrate effects an additional flame-retarding action.

It has been found that such fillers in epoxy resin materials of known type have decomposition temperatures which are too close together to satisfy high demands as to sufficient protection against fire.
* The present invention avoids this disadvantage.

The fire-retarding epoxy resin material of the invention, which consists of addition substances and/or fillers which react endothermally at elevated temperatures having an amine-cured epoxy resin as binder characterized by the fact that, in addition to the hardener used, it also contains 30 to 70% by weight, referred to the weight of the epoxy resin plus hardener, of at least two substances which contain more than 20 mol% nitrogen and/or phosphorus and have a decomposition temperature of 100 to 400° C.

Preferred nitrogen-containing substances which can be used comprise cyclic and aliphatic polyamines having molecular weights of between 100 and 400, such as melamine compounds, guanidine compounds and urea compounds, as well as poly-methylene and poly-ethylene polyamines, and aromatic or alicyclic-aromatic polyamines, for instance N-phenyl-N-cyclohexyl-p-phenylenediamine. There are particularly preferred substances which contain both nitrogen and phosphorus atoms, such as melamine phosphate, guanidine phosphate, and guanylureaphosphate. In addition, other salts of such nitrogen bases can also be used, such as melamine borate, guanidine carbonate, and the like. The decomposition temperatures of the substances used in the epoxy resin material should be at least 50° C apart, and preferably at least 100° C apart.

Aside from amine compounds, other nitrogen-forming substances are suitable, provided that the decomposition temperatures lie within the range indicated, such as quaternary ammonium compounds or hydrazine compounds, for instance, benzosulfohydrazide.

In addition, the epoxy resin materials of the invention may contain compounds which give off chlorine or bromine at temperatures of 100 to 600° C, such as known fire-retarding substances, for instance pentachlorothiophenol and its metal salts or else chlorine- or bromine-containing phosphorus compounds, such as tris(dichlorethyl)phosphate or tris(2,3-dibromopropyl)-phosphate.

These chlorine or bromine compounds should preferably be added in the quantities customary for fireproofing, this amount being in particular 10 to 30% by weight, referred to epoxy resin.

It has furthermore been found that those inorganic, and particularly mineral, substances which have a strongly water-binding action can advantageously be used in addition in the epoxy resin materials of the invention since they have the action of slowly again giving off at 600 to 1000° C the water which they took up at lower temperature. In this way, an increased foaming of the carbon structure formed by burning is effected and an additional fireproofing is obtained by the binding of the heat of vaporization. Such substances are, in particular, the aluminosilicates known as molecular sieves (zeolites), but also anhydrite and other calcium sulfates containing only a small amount of water of crystallization (hemihydrate) and aluminum hydroxide.

In order to increase the stability of the porous carbon structure which remains after the ignition or removal of the fire-retarding epoxy material of the invention, glass fibers, preferably in a finely ground condition of a length of less than 1 $\mu$m and a thickness of 7 to 13 m$\mu$ or else in a length of 0.5 to 7 mm (electric glass), can be added to the mixture of epoxy resin, hardener, and fillers, as well as fire-retarding, foam-forming, and water-binding additions. These glass fibers act also to delay the decomposition of the nitrogen-containing and phosphorus-containing substances and thus to improve the retardation of inflammation and resistance to fire.

In accordance with one particular embodiment of the invention, a protective layer which has a base of a polyurethane and is possibly provided with known flame-retarding additions is imparted to the fire-retarding epoxy material. It has been found that this protective layer, upon the thermal action of the increase in volume of the material, yields to a certain extent, dependent on the elastomeric behavior of the polyurethane selected. As a rule, this protective layer cracks only when temperatures above 200 to 300° C are reached.

Furthermore, the foaming of the epoxy material under the action of greater heat is controlled by the protective layer. A skin is formed and the substrate does not tear. Furthermore, due to the protective layer, pigmentation and reduction of the chalking of addition substances of the epoxy material is made possible.*
* The protective layer may possibly contain ordinary fire-retarding additives, such as chloro or bromo-organophosphates, possibly together with Al(OH)$_3$.

As epoxy resin which forms the binder for the material in accordance with the invention, an ordinary resin having more than one reactive epoxy group can be used, such as obtained for instance by reacting an epihalohydrin with a polyfunctional phenol, for instance, bisphenol A.

As hardeners, there are primarily used known polyamines or polyaminoamides, preferably those with hardening temperatures above 80° C. By the use of amine hardeners — which also include cycloaliphatic or hererocyclic amine bases — assurance is already obtained that a certain amount of nitrogen will be formed under the action of fire, this counteracting the burning. In addition, ordinary polycarboxylic anhydride hardeners can also be simultaneously employed. In order to form a porous carbon layer upon the pyrolitic decomposition of the epoxy material, the known mono- or polyammonium phosphates, as well as possibly polyols, for instance, pentaerythritol, and gasification reinforcers such as melamine or dicyandiamide are preferably used. In general, the polyepoxy material should have as many reactive groups as possible or form them under the action of heat so that endothermic secondary reactions with the additives or their decomposition products are possible.

The fire-retarding epoxy resin material of the invention is used either directly as coating composition or in laminates, or else applied to a primer which is adapted to the substrate to be protected, such as wood or iron, and is ordinarily also an epoxy resin. When using a polyurethane top layer, a coating of one to three layers can thus be applied by the customary coating methods, by dipping, brushing, or spraying methods. In general, about 50 to 150 g/m² of primer, 1000 to 3000 g/m² of epoxy material layer, and a polyurethane protective layer of a thickness of 0.05 to 0.1 mm are applied in order to achieve fire-protection values corresponding to DIN 4102 classes F60 – F90. This corresponds to a layer thickness of the epoxy resin material of about 0.1 to 2 mm, thicker layers being applied by the spray method.

Upon the production of the fire-retarding epoxy material of the invention, the additives are added in part to the resin component and in part to the hardener or mixture of hardeners, before the two components are mixed together. In addition, the active diluents such as butylglycidyl ethers or other epoxy solvents can possibly be used in order to adjust the viscosity. The viscosity of the reactive diluent should not exceed 500 cP.

The fire-retarding additions are preferably mixed together and finely ground to very fine form, the amount of the additions amounting to a total of 30 to 70% by weight, referred to the mixture of epoxy resin and hardener. The mixing of the additons with the epoxy resin and/or hardener mixture is effected in known manner by means of machines or rollers, such as known from the manufacture of paints. A neutral resin, for instance, hydrocarbon resin, may possibly also be admixed with the epoxy resin.

The range of use of the new epoxy resin material lies in the field of the fire protection of wood, iron girders, particularly in large industrial shops, and airplane hangars, and furthermore, in petrochemistry for the fireproofing of tanks and pipelines, and in oil tankers and other ships. The particular adherence of the epoxy resins to plastic substrates permits fire protection also for all other plastics which are easily burnable, either directly or by means of a primer.

The invention will be explained in further detail by the following examples.

EXAMPLE 1

A mixture is used consisting of an epoxy resin produced from epichlorhydrin and bisphenol A (Gromalit K300 of Gross & Perthun, Mannheim, Federal Republic of Germany) and a hardener of polyamines (Gromalit H300) in a ratio of 4:1 as primer for the coating (100 g/m²) of a substrate which is to be protected.

Over this, after hardening, there is applied an epoxy resin material of the following composition:

| | | |
|---|---|---|
| A. Epoxy resin of epichlorhydrin and bisphenol A (0164/SV - Rutgerswerke Duisburg) | 34 | parts by weight |
| Mixture of the following fillers or addition substances: | | |
| Pentaerythritol, fine | 13.82 | parts by weight |
| Ammonium polyphosphate | 24.72 | " |
| Benzoin guanamine resin | 4.44 | " |
| Malamine resin | 5.35 | " |
| Tris (dichlorethyl)phosphate (Phosgard C 22 R of Monsanto, USA) | 8.58 | " |
| Asbestos fibers | 0.52 | " |
| Mica | 4.74 | " |
| Iron oxide red | 3.83 | " |
| B. Hardener mixture | | |
| Cycloaliphatic amine | 42.24 | " |
| Polyamide (Hardener LC of Rutgerswerke, Duisburg) | 25.34 | " |
| Trisdimethylaminophenol | 12 | " |
| Mixture of the following fillers: | | |
| Glass fibers of less than 1μ m ("milled fibers") | 10.42 | " |
| Aluminum hydroxide | 10.0 | " |

Four parts by weight of A are mixed with one part by weight B. After curing, this layer is provided with a top layer of a polyurethane prepared from A) 3 parts by weight of a mixture of 29.83 parts by weight of polyester of adipic acid, phthalic acid and glycerol (Desmophen 800 of Bayer AG) and butylacetate in a ratio of 2:1, and a filler/additive mixture consisting of:

| | | |
|---|---|---|
| Titanium dioxide | 34.25 | parts by weight |
| Talc | 8.33 | " |
| Barite | 8.33 | " |
| Tris (dichlorethyl)phosphate (Phosgard C 22 R) | 12.58 | " |
| Ethyl glycol acetate | 7.68 | " | and (B) 1 part by weight of a mixture of 61 parts by weight of triisocyanate of glycerol and toluene diisocyanate (Desmodur N of Bayer AG) and of a solvent mixture of 19.5 parts by weight of methyl glycol acetate and 19.5 parts by weight of xylene.

Thickness of application: 40 to 60 μm.

It has been found that with an applied amount of epoxy resin material of 1350 g/m² average fire resistance is obtained, while with 2700 g/m² maximum resistance to fire is obtained.

EXAMPLE 2

An epoxy resin of epichlorhydrin/bisphenol A with a hardener mixture of 80 parts by weight of a polyamine, 10 parts by weight of a polyamino acid, and 10 parts of o-phthalic anhydride in a weight ratio of 4:1 was provided with the following additives, which had been prepared by mechanical mixing followed by grinding of the components:

| | | | |
|---|---|---|---|
| (a) | 42.0 | parts by weight | of ammonium polyphosphate |
| | 25.0 | " | of pentaerythritol |
| | 10.0 | " | of dicyandiamide |
| | 5.0 | " | of melamine phosphate |
| | 10.0 | " | of guanyl urea |
| | 5.0 | " | of zeolite paste 50% |
| | 10.0 | " | of tris(2,3-dibrompropyl)phosphate |
| (b) | 30.0 | parts by weight | of ammonium polyphosphate |
| | 35.5 | " | of pentaerythritol |
| | 10.5 | " | of melamine phosphate |
| | 20.0 | 141 | of guanyl urea phosphate |
| | 10.0 | " | of secondary guanidine phosphate |
| | 7.5 | " | of dicyandiamide |
| (c) | 30.0 | parts by weight | of ammonium polyphosphate |
| | 35.5 | " | of pentaerythritol |
| | 10.5 | " | of melamine borate |
| | 10.0 | " | of melamine |
| | 15.0 | " | of guanyl urea |
| | 5.0 | " | of chloralkyl phosphoric acid |

|  |  |  |
|---|---|---|
| 10.0 | " | ester (Phosgard 2 XC 20) of milled glass fibers |
| 5.0 | " | of glass fibers of a length of 0.5 to 7 mm |
| 5.0 | " | of zeolite paste 50% |
| 10.0 | " | of secondary guanidine phosphate |

In the individual cases 30, 50 and 70% by weight of mixtures (a) to (c) were admixed in the epoxy resin/hardener mixture.

Upon fire tests with wood with layer thicknesses of the resultant epoxy resin material of about 1 mm, protection values of DIN 4102 Fire Class F60 were obtained in each case.

EXAMPLE 3

An epoxy resin hardener mixture in accordance with Example 2 was treated with a mixture of the following addition substances (50% by weight).

| 42 | parts by weight | ammonium polyphosphate |
|---|---|---|
| 25 | " | pentaerythritol |
| 10 | " | melamine |
| 5 | " | chloralkylphosphate (Phosgard 2 XC 20 of Monsanto) |
| 5 | " | benzosulfohydrazide in chloropharaffin |
| 5 | " | zinc salt of pentachlorothiophenol |
| 1 | " | zeolite |

Upon coating wood in a thickness of 1.5 mm Fire Class F90 of DIN 4102 was obtained.

We claim:

1. A fire-retarding foam-forming epoxy resin composition suitable for protecting substrates as an applied layer thereon, said composition comprising essentially of an epoxy resin containing at least one amine curing agent and the following ingredients:
   about 30% to 70% by weight referred to the epoxy resin-curing agent content of at least two members containing 20 mol% nitrogen and/or phosphorus selected from the group consisting of cyclic, aliphatic, aromatic, alicyclic-aromatic polyamines having a molecular weight of about 100 to 400 and melamine phosphate, quanidine phosphate, guanylurea phosphate, melamineborate, guanidine carbonate and benzosulfohydrazide, said epoxy composition optionally containing fillers,
   said members having a decomposition temperature of about 100° C to 400° C and being characterized in that the decomposition of each member differs from each other by at least about 50° C.

2. The fire-retarding epoxy resin composition of claim 1, wherein the alicyclic-aromatic polyamine is N-phenyl-N-cyclohexyl-p-phenylenediamine.

3. The fire-retarding epoxy resin composition of claim 1, wherein said composition also contains at least one halogen compound which yields chlorine or bromine at temperature in the range of about 100° C to 600° C.

4. The fire-retarding epoxy resin composition of claim 3, wherein said at least one halogen compound is selected from the group consisting of pentachlorthiophenol or a metal salt thereof, tris(dichloroethyl)-phosphate and tris(2,3-dibromopropyl) phosphate.

5. The fire-retarding epoxy resin composition of claim 1, wherein said composition contains a filler of inorganic material having a strong water-binding property and which yields water at a temperature of about 600° C to 1000° C.

6. The fire-retarding epoxy resin composition of claim 5, wherein said inorganic filler is selected from the group consisting of a zeolite of alumino-silicate, calcium sulfate low in water of crystallization including anhydrite and aluminum hydroxide.

7. The fire-retarding epoxy resin composition of claim 1, wherein said composition contains at least one inorganic filler material selected from the group consisting of particles of glass fibers, asbestos or mica.

8. A fire-retarding foam-forming epoxy resin composition in the form of a coating comprising a plurality of cured layers on a substrate, said composition comprising essentially of an epoxy resin containing at least one amine curing agent and the following ingredients:
   about 30% to 70% by weight referred to the epoxy resin-curing agent content of at least two members containing 20 mol% nitrogen and/or phosphorus selected from the group consisting of cyclic, aliphatic, aromatic, alicyclic-aromatic polyamines having a molecular weight of about 100 to 400 and melamine phosphate, guanidine phosphate, guanylurea phosphate, melamine borate, guanidine carbonate and benzosulfohydrazide, said epoxy composition optionally containing fillers,
   said members having a decomposition temperature of about 100° C to 400° C and being characterized in that the decomposition of each member differs from each other by at least about 50° C,
   and characterized by at least one protective layer of polyurethane over said cured coating of epoxy resin composition.

9. A method of protecting a substrate with a fire-retarding epoxy resin composition coating which comprises, formulating said composition by mixing said epoxy resin with at least one amine curing agent and then adding thereto the following ingredients,
   about 30% to 70% by weight referred to the epoxy resin-curing agent content of at least two members containing 20 mol% nitrogen and/or phosphorus selected from the group consisting of cyclic, aliphatic, aromatic, alicyclic-aromatic polyamines having a molecular weight of about 100 to 400 and melamine phosphate, guanidine phosphate, guanylurea phosphate, melamine borate, guanidine carbonate and benzosulfohydrazide, said epoxy composition optionally containing fillers,
   said members having a decomposition temperature of about 100° C to 400° C and being characterized in that the decomposition of each member differs from each other by at least about 50° C,
   and applying a plurality of layers of said composition as a coating to the substrate to be protected and curing said composition.

10. The method of claim 9, wherein prior to applying said composition to the substrate to be protected, the substrate is primed with a coating of a mixture of an epoxy resin - amine curing composition which composition is cured in place.

11. The method of claim 9, wherein the alicyclic-aromatic polyamine in said composition coating applied to the substrate is N-phenyl-N-cyclohexyl-p-phenylenediamine.

12. The method of claim 9, wherein the composition applied as a coating to the substrate also contains at least one halogen compound which yields chlorine or bromine at temperatures in the range of about 100° C to 600° C.

13. The method of claim 12, wherein the composition applied as a coating to the substrate contains at least one halogen compound selected from the group consisting of pentachlorthiophenol or a metal salt thereof, tris(dichloroethyl)-phosphate and tris(2,3-dibromopropyl) phosphate.

14. The method of claim 9, wherein the composition applied as a coating to the substrate contains a filler of inorganic material having a strong water-binding property and which yields water at a temperature of about 600° C to 1000° C.

15. The method of claim 14, wherein the composition applied as a coating to the substrate contains said inorganic filler selected from the group consisting of a zeolite of alumino-silicate, calcium sulfate low in water of crystalization including anhydrite and aluminum hydroxide.

16. The method of claim 9, wherein the composition applied as a coating to the substrate also contains at least one inorganic filler material selected from the group consisting of particles of glass fibers, asbestos or mica.

17. A method of protecting a substrate with a fire-retarding epoxy resin composition coating which comprises, formulating said composition by mixing said epoxy resin with at least one amine curing agent and then adding thereto the following ingredients, about 30% to 70% by weight referred to the epoxy resin-curing agent content of at least two members containing 20 mol% nitrogen and/or phosphorus selected from the group consisting of cyclic, aliphatic, aromatic, alicyclic-aromatic polyamines having a molecular weight of about 100 to 400 and melamine phosphate, guanidine phosphate, guanylurea phosphate, melamine borate, guanidine carbonate and benzosulfohydrazide, said epoxy composition optionally containing fillers, said members having a decomposition temperature of about 100° C to 400° C and being characterized in that the decomposition of each member differs from each other by at least about 50° C, applying a plurality of layers of said composition as a coating to the substrate to be protected and curing said composition, and then applying to said cured coating at least one protective layer of polyurethane.

* * * * *